US012474970B2

(12) United States Patent
Christner et al.

(10) Patent No.: US 12,474,970 B2
(45) Date of Patent: Nov. 18, 2025

(54) INTELLIGENT FUNCTION EXECUTION LEVERAGING METADATA

(71) Applicant: Dell Products L.P., Round Rock, TX (US)

(72) Inventors: Joel Christner, El Dorado Hills, CA (US); Trevor Scott Conn, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 568 days.

(21) Appl. No.: 17/933,196

(22) Filed: Sep. 19, 2022

(65) Prior Publication Data
US 2024/0095091 A1    Mar. 21, 2024

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/45562* (2013.01); *G06F 2209/501* (2013.01)

(58) Field of Classification Search
CPC .................................................... G06F 9/5077
See application file for complete search history.

(56) References Cited

U.S. PATENT DOCUMENTS

| | | | | |
|---|---|---|---|---|
| 11,778,053 | B1 * | 10/2023 | Allen | H04L 67/34 709/220 |
| 12,118,395 | B1 * | 10/2024 | Virtuoso | G06F 9/5072 |
| 2012/0209901 | A1 * | 8/2012 | Xu | H04L 67/60 709/201 |
| 2017/0116017 | A1 * | 4/2017 | Rose | G06F 9/45558 |
| 2019/0114251 | A1 * | 4/2019 | Sapozhnikov | H04L 43/55 |
| 2021/0124822 | A1 * | 4/2021 | Tiwary | G06F 21/53 |

OTHER PUBLICATIONS

Overview of how Serverless works: https://www.datadoghq.com/knowledge-center/serverless-architecture/#:~: text=Serverless%20architecture%20is%20an%20approach,storage%20systems%20at%20any%20scale Accessed Apr. 2022.
AWS Lambda: https://aws.amazon.com/lambda/ Accessed Apr. 2022.
Azure Functions: https:/azure.microsoft.com/en-us/services/functions/#overview Accessed Apr. 2022.
KNative Serving Overview: https://knative.dev/docs/serving/ Accessed Apr. 2022.

* cited by examiner

*Primary Examiner* — Charlie Sun
(74) *Attorney, Agent, or Firm* — Workman Nydegger

(57) ABSTRACT

Executing functions in serverless platforms leveraging metadata is disclosed. Embodiments of the invention related to using metadata when placing and/or executing functions. The metadata includes request metadata, container or function metadata, node metadata, and/or data metadata. The metadata allows a function to be placed and executed in a manner that accounts for user intent, container requirements, node resources, and data location. Functions can be placed across different serverless platforms. Once the metadata is evaluated and a location is selected, a function is placed and executed at the selected location.

18 Claims, 4 Drawing Sheets

… (1)

INTELLIGENT FUNCTION EXECUTION LEVERAGING METADATA

FIELD OF THE INVENTION

Embodiments of the present invention generally relate to edge-core-cloud related computing including the execution of serverless workloads. More particularly, at least some embodiments of the invention relate to systems, hardware, software, computer-readable media, and methods for intelligently executing functions in a computing environment.

BACKGROUND

A datacenter is generally a large group of computing resources that may be used for storage, processing, data distribution, and the like. Datacenters are used for computing platforms that provide various services, which are generally described as as-a-Service (aaS) offerings. One example is Function as a Service (FaaS), which is also referred to as serverless platforms. While FaaS still uses servers or computing devices, FaaS abstracts the infrastructure management from users or clients.

Serverless platforms (e.g., AWS Lambda, Microsoft Azure Functions, Google Cloud Functions, IBM OpenWhisk) are examples of serverless services/platforms. However, serverless workloads execute based on how and where they are invoked. Serverless infrastructure, however, is not federated and function workloads cannot be dynamically and intelligently placed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
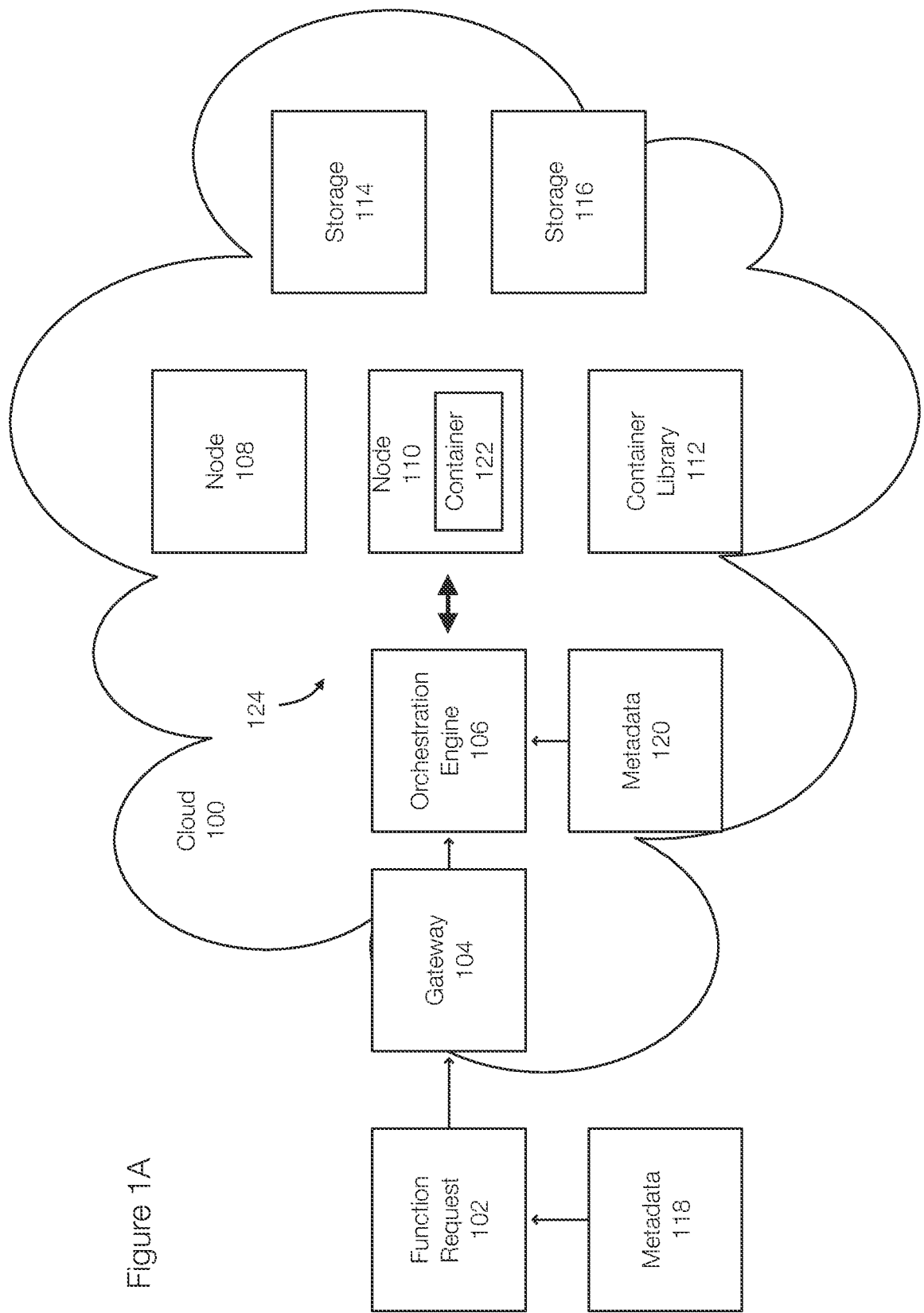
FIG. 1A discloses aspects of a function request and a serverless platform infrastructure.

Embodiments of the present invention generally relate to executing function workloads in serverless platforms. More particularly, at least some embodiments of the invention relate to systems, hardware, software, computer-readable media, and methods for dynamically placing function workloads in serverless platforms.

A serverless platform is an example of an infrastructure that provides functions as a service (FaaS). The infrastructure includes hardware that are configured to execute functions. This may be achieved, for example, using an architecture such as Kubernetes, which allows computing resources (e.g., a server cluster) to be used for applications, services, containers, microservices, or the like.

To use a serverless platform, a developer may write a function that fulfills a specific purpose. The function may be embodied as a container image that can be instantiated as a container in the serverless platform. An event that will trigger the function may also be defined. For example, the event that triggers a serverless function may be a request, such as an HTTP request. Receiving a request at a particular gateway may trigger a function. Once the trigger is received or detected, the function is executed in the infrastructure of the serverless platform. If an instance of the function is not already running, a new instance of the function may be started. The result of the executed function is returned to the user (e.g., displayed in the user's application) or in another manner such as to the application.

Embodiments of the invention allow serverless platforms to be federated and allow serverless workloads to span multiple platforms. For example, embodiments of the invention may allow a request received at a first serverless platform to be executed by a different platform.

By enabling serverless workloads to span edge-core-cloud (more generally edge-cloud) deployments, serverless workloads can be placed dynamically and efficiently. Embodiments of the invention allow aspects, characteristics, conditions, or the like of functions to be considered when placing and executing serverless workloads.

In example embodiments, metadata (existing, implied, and/or generated) is used to evaluate the placement and execution of serverless workloads. By way of example, the execution of a function can be associated with metadata that identifies from where and via what mechanism (e.g., HTTP request, message queue) the function was invoked, includes an identify of the requestor or process that invoked the function, identifies where the source code, the runtime, and dependencies of the function are stored, identifies where data assets required by the function are located, identifies what services are required by the function, identifies locations of functions that may be invoked, identifies where results will be sent/stored, and/or specifies hardware requirements or preferences and/or locations of the hardware.

This metadata is obtained or generated from a function request, from the function (or container image), from nodes in the infrastructure, from data sources, or the like. Using metadata that can be associated with a function provides more control over the domain of function execution. A user or application may have some control over function placement and function execution.

Embodiments of the invention allow function placement and function execution to consider the entity invoking the function, where the data required by the function is stored and how the data is accessed, where the results of the function execution are stored, and what resources are required by the function (external services, other functions, GPUs, accelerators, or the like).

Embodiments of the invention allow serverless platforms to automatically adapt and posit workloads based on these metadata and/or other characteristics, conditions, or the like. Using the metadata, a distributed or federated architecture can be provided that allows functions to execute at more intelligently selected locations. The entity invoking a function also has control over how a serverless workload is placed and executed.

FIG. 1A discloses aspects of leveraging metadata in serverless platforms. FIG. 1A illustrates a serverless platform 124 that operates in a cloud environment (e.g., a datacenter). The serverless platform 124 may also operate in an edge or core computing environment.

In FIG. 1A, a function request 102 is received at a gateway 104. In this example, the function request 102 may be an HTTP request. The gateway 104 is representative of the various manners in which functions may be triggered or invoked. Thus, the gateway 104 may be an API (Application Programing Interface) gateway, a message queue, or the like.

The serverless platform 124 represents a computing infrastructure such as an environment configured to execute containers. The serverless platform 124 may include physical machines, virtual machines, or the like. The serverless platform 124 may include a server cluster, where each server is a node. The node 108 and 110 represent the hardware on which functions are executed and include processors, memory, networking equipment, or the like. The serverless platform 124 may also include storage devices configured to store data. The storage devices are represented by the storage 114 and the storage 116. The data required by a particular function, however, may reside outside of the serverless platform 124. Alternatively, the serverless platform 124 could also be deployed in an edge or core environment.

In this example, a function may be deployed to a node in the serverless platform 124 as a container. For example, the container 122 has been deployed to the node 110 and is executing on the node 110. The container library 112 may include container images that can be deployed to nodes. Alternatively, runtime containers may be running on the nodes of the serverless platform 124.

The orchestration engine 106 may be configured to orchestrate the execution of a requested function identified in the function request 102. Orchestrating the execution of a requested function may include placing the function based on an evaluation of relevant metadata. The orchestration engine 106 may identify a node or other resource for fulfilling or performing the function request 102. In one example, the orchestration engine 106 may place the function workload inside the serverless platform 124 or in a different serverless platform.

The orchestration engine 106 considers metadata, such as the metadata 118 and the metadata 120 when orchestration the function request 102.

For example, the metadata 118 may be included as a header of the function request 102. The metadata 118 may specify a desired location for executing the function and data indicating an authenticity of a requestor. By way of example, the metadata 118 may also indicate that the request should fail if the function is not available at the desired location or indicate that any other location is suitable if the desired location is not available.

The metadata 120, which is stored in or accessible to the orchestration engine 106, may relate to aspects of the infrastructure of the serverless platform 124. More specifically, the metadata 120 may include node metadata, function/container metadata, data (data source) metadata, or the like or combination thereof.

For example, node metadata (e.g., metadata tags) may be generated and applied to the nodes within the orchestration engine 106. The node metadata may include the capabilities or resources of or available to the node. Thus, the metadata 120 may indicate that the node 110 contains a GPU or other accelerator, a solid-state drive, persistent memory, processor type or the like. By way of example, the metadata for the node 110 may be expressed as "containsGPU: true, gpuType: nvidia-rtx-3090, disktype: ssd, persistent memory: true".

The metadata 120 may also include metadata to define locations. The location may correspond to the location of the serverless platform 124. The location metadata may be, for example, "locationID:2345, name:usWest".

The data metadata included in the metadata 120 may also map data assets by a unique identifier and their given URIs (Uniform Resource Indicator). Mapping data assets by a unique identifier allows assets to be identified. The metadata may read, for example, "dataID:1234, name:'Test Data', URI:'http:// . . . ,locationId:2345'".

The metadata 120 may also include function or container metadata that is applied to container images. The container metadata may identify a globally unique identifier (functionID:'abcd'), where the container image is stored (locationID: 2345), runtime (runtime: nodeJs), runtime version (runtimeVersion: 16), dependencies (name: express, version: 4.17, . . . ), where the output is emitted (output: return), what data is required (dataID: 1234), and external services (requiresGPU: true).

In one example, the cloud 100 (or serverless platform 124) may be federated or associated with other infrastructures or platforms that may be in different locations. This expands the ability of embodiments of the invention place and execute a function. The specific infrastructure in which a request is executed may be an edge, core, or cloud based serverless platform.

Figure 1B:
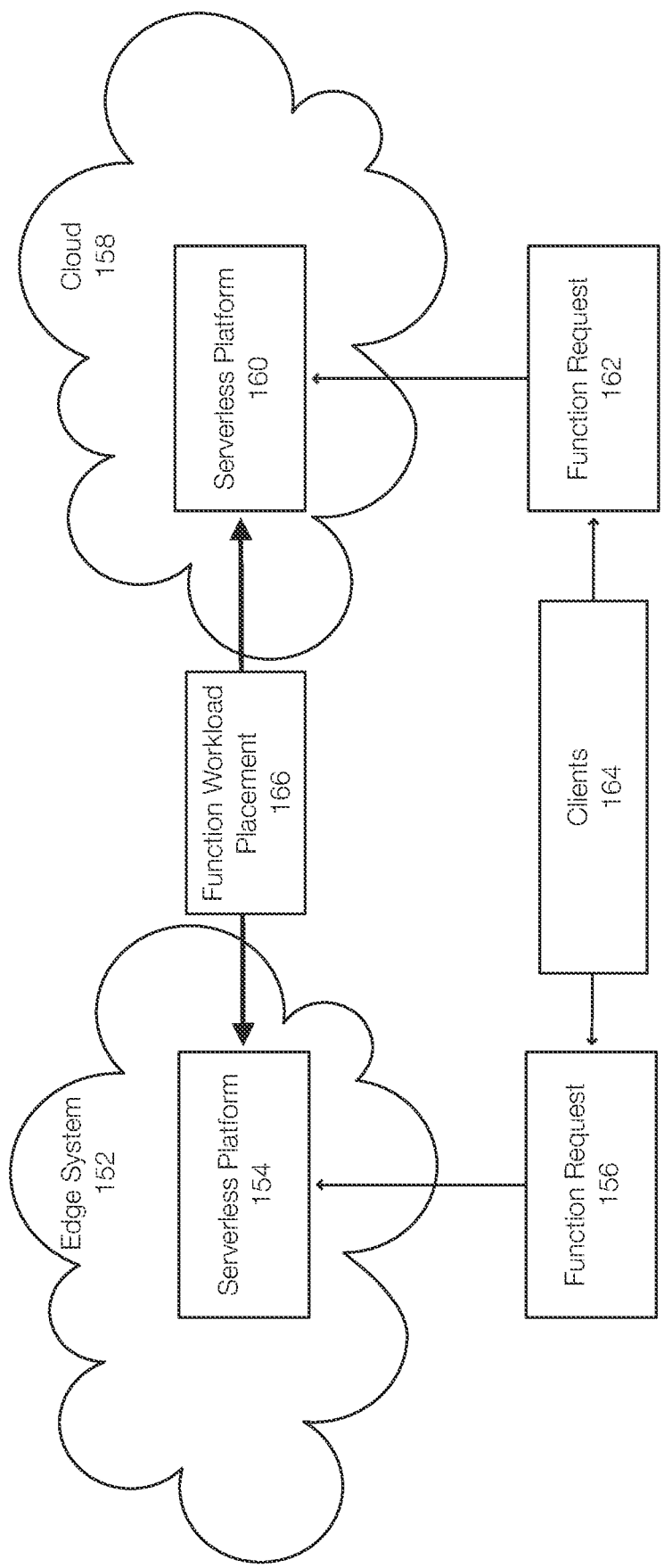
FIG. 1B discloses aspects of placing function workloads in serverless platforms.

FIG. 1B discloses aspects of placing function workloads. FIG. 1B illustrates an edge system 152 in which a serverless platform 154 is formed and a cloud 158 in which a serverless platform 160 is formed. The serverless platforms 154 and 160 may each include a cluster of servers.

In this example, clients 164 may submit function requests, illustrated as the function requests 156 and 162, to the serverless platforms 154 and 160. The clients 164 may include applications operating on end user devices (smartphones, tablets, computers, or other devices).

Embodiments of the invention illustrate the function requests can be ingested at different locations and in different manners. For example, the serverless platform 154 may receive a function request 156. After evaluating the metadata associated with the function request 156, the serverless platform 154 may place the function workload 166 at the serverless platform 160. Similarly, the serverless platform 160 may place a function workload associated with the function request 162 at the serverless platform 154.

In a more specific example, the function request 162, even though ingested at the serverless platform 160, may include request metadata that specifies the serverless platform 154, which may be closer to the specific client.

In one example, the metadata evaluated by the serverless platform 160 may determine that the data required by the function is located in the edge system 152 and that, due to data locality, the function is best placed in the serverless platform 154.

In one example, an application may be an edge-core-cloud deployment. In this type of application, there are functions that are best suited to be performed in an edge environment, which is closer to the user and/or close to data assets. Other functions may be better suited for execution at a cloud environment.

Figure 2:
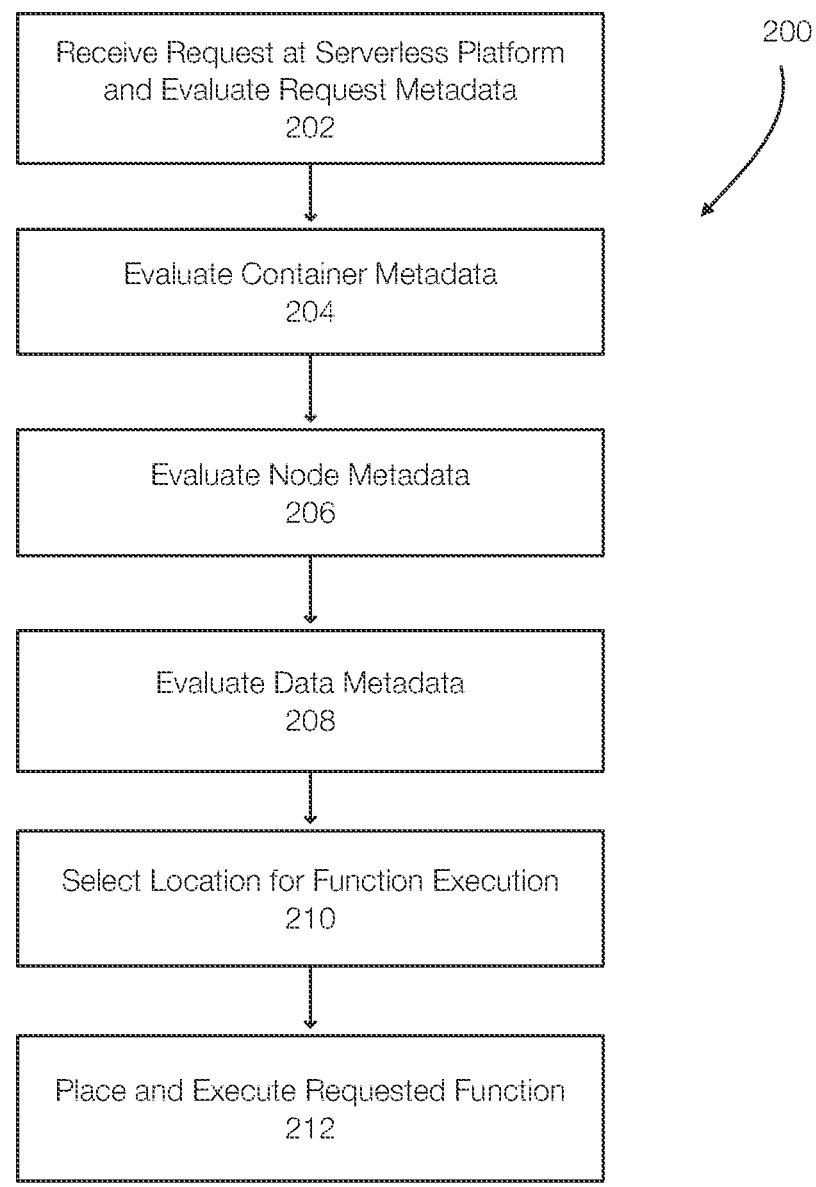
FIG. 2 discloses aspects of metadata-based function orchestration in a serverless platform.

FIG. 2 discloses aspects of orchestrating functions in a serverless platform. In the method 200, a request to execute a function may be received 202 at a platform. The metadata of the request is evaluated, for example at an orchestration engine. In one example, the request metadata specifies a location to execute the function. Evaluating the request metadata may include determining whether the function exists or can be instantiated at the specified location. If the function is present or can be instantiated, the method 200 may continue, otherwise the request may fail. In another example, the request metadata may provide an alternative location or allow the function to be executed at a suitable location if the specified location is not available. Evaluating the request metadata may also include performing authentication processes.

Next, container metadata is evaluated 204. More specifically, the container (or the container image) that executes the function or that embodies the function may be associated with metadata at the orchestration engine that specifies services required. The container metadata may indicate that a GPU is required or that certain dependencies should be available.

Next, the node metadata is evaluated 206. The orchestration engine may match the container metadata to the node metadata. For example, when a function (or container) requires a GPU, the node that has a GPU may be selected or matched to the container. This allows the container to be fun on a specific node.

Next, data metadata is evaluated 208. More specifically, the execution of a container or a function may require access to certain data (e.g., a database or other storage). The data metadata may identify the location of data sources that may be required by functions.

The method 200 thus evaluates the container metadata, the node metadata, and the data metadata to place the function in an appropriate serverless platform, which may be different from the serverless platform that received the function request.

In one example, the serverless platform may have or may have access to metadata for other serverless platforms. In a situation where a provider distributes their serverless platform from the edge to the cloud, the metadata for that distributed serverless platform may be evaluated.

When evaluating or processing the metadata, for example, the orchestration engine may be configured to determine whether a local function container should be executed or whether a container closer to the data should be used. This may be conditioned on ensuring that the requirements of the function can be satisfied at either of these locations. Other conditions may include load distribution considerations, which may be based on current or historical telemetry information.

This evaluation allows a location to be selected 210 for function execution. The location may identify a specific serverless platform, a specific node in a specific serverless platform, or the like. Once the location is selected, the function is placed and executed 212.

In one example, embodiments of the invention may specify, using the metadata, data, function, and/or resource locality for function execution. The metadata can be evaluated, in one example, to identify a situation that best satisfies data, function (container), and resource locality. This may be done while accounting for any requirements set forth in the request metadata. For example, the request metadata may specify a location and the orchestration engine may evaluate metadata for that location to best satisfy container, node, resource requirements of conditions.

In one example, a serverless platform fabric is disclosed that allows functions to be more optimally placed in different infrastructures or different serverless platforms. The serverless platform fabric may include a database or other mechanism to access the metadata of the individual serverless platform infrastructures.

For example, a set of serverless applications may be built to support autonomous vehicles. A series of deployments are made at edge locations in addition to a centralized core location. The intent of the edge locations is to quickly ingest data from vehicles and provide near real time results for certain calculations. The intent of the centralized core location is to provide aggregate calculations over a larger pool of data collected from edge locations. Metadata, as disclosed herein, is applied at each of the deployments. In addition, it is assumed that some nodes include GPUs while other nodes do not.

User functions that should be executed at the edge can explicitly include an edge location (e.g., by name or canonical identifier) in the request or indicate, (explicitly or implicitly) that the function should be invoked near an edge data set on a node containing a GPU. User functions that should be run in the core can explicitly include a core (or cloud) location (e.g., by name or by canonical identifier) in the request or indicate (explicitly or implicitly) that the function should be invoked near a core data set on a system containing a GPU.

Advantageously, either through explicit instruction or by implication caused by the request metadata and or the infrastructure metadata, workloads can be posited in the correct location, and on the correct nodes. This is an example of a federated edge-core-cloud serverless platform.

In example embodiments, the location can be specified in different manners. For example, the function may need to obtain a reading from a specific sensor. By knowing the location of that specific sensor, embodiments of the invention can invoke a function that is close to the sensor.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, serverless platform operations, function operations, function deployment and execution operations, metadata mapping operations, metadata generation operations, or the like.

New and/or modified data collected and/or generated in connection with some embodiments, may be stored in a data environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Edge computing environments may also include hardware infrastructure and are capable of managing and executing functions.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a function request to execute a function in a computing environment, wherein the function request includes request metadata, evaluating second metadata including container metadata, node metadata, and data metadata associated with the computing environment, selecting a location from the request metadata when the request metadata includes the location or based on the evaluation of the second metadata and the request metadata, placing the function at the location, and executing the function and returning a result of the function.

Embodiment 2. The method of embodiment 1, wherein the location comprises at least one of a node or a serverless platform, wherein the is specified in the request metadata and the node and the container are selected from the evaluation of the second metadata, further comprising failing the request when the location in the request metadata is not available.

Embodiment 3. The method of embodiment 1 and/or 2, wherein the node metadata comprises services metadata, memory metadata, processor metadata, and/or other node metadata, wherein the container metadata comprises an identifier, a storage location, runtime instances, dependencies, where output is emitted, and external services required, and wherein the data metadata comprises data set name, data set location, and/or other container metadata.

Embodiment 4. The method of embodiment 1, 2, and/or 3, further comprising mapping the node metadata based on requirements of the container specified in the container metadata, wherein the container metadata includes services.

Embodiment 5. The method of embodiment 1, 2, 3, and/or 4, wherein selecting the location includes selecting a serverless platform from a set of available serverless platforms.

Embodiment 6. The method of embodiment 1, 2, 3, 4, and/or 5, further comprising selecting the location based on a locality of data required by the function to a requestor.

Embodiment 7. The method of embodiment 1, 2, 3, 4, 5, and/or 6, further comprising selecting the node in a serverless platform based on requirements of the container and services of the node.

Embodiment 8. The method of embodiment 1, 2, 3, 4, 5, 6, and/or 7, further comprising federating an edge serverless platform and a cloud serverless platform, wherein a first function is deployed to the edge serverless platform and a second function is deployed to the cloud serverless platform.

Embodiment 9. The method of embodiment 1, 2, 3, 4, 5, 6, 7, and/or 8, further comprising selecting the edge serverless platform when the first function is requested and selecting the cloud serverless platform when the second function is requested.

Embodiment 10. The method of embodiment 1, 2, 3, 4, 5, 6, 7, 8, and/or 9, further comprising collecting, generating and/or inferring the request metadata and the second metadata.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
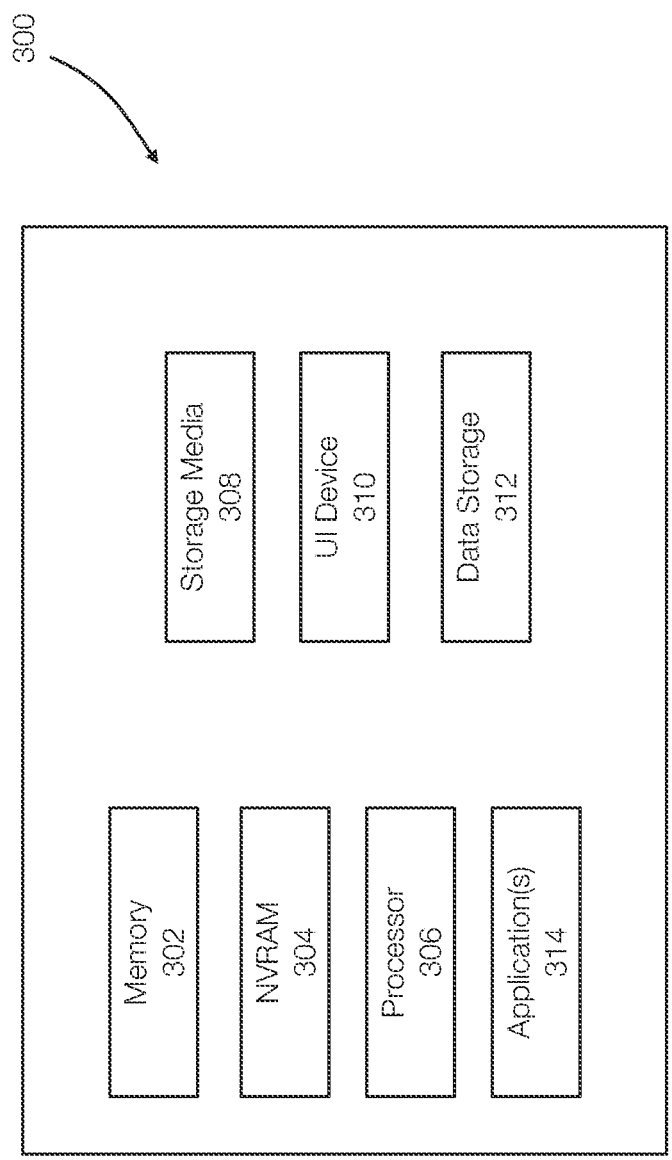
FIG. 3 discloses aspects of a computing device, system or entity.

With reference briefly now to FIG. 3, any one or more of the entities disclosed, or implied, by FIG. 3, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3. FIG. 3 may also illustrate a computing system or entity. For example, a cluster of servers, an edge or cloud infrastructure may include processors, memory, storage and the like.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid-state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method, comprising:
receiving a function request to execute a function in a computing environment, wherein the function request includes request metadata;

evaluating second metadata including container metadata, node metadata, and data metadata associated with the computing environment, wherein the node metadata comprises services metadata, memory metadata, and processor metadata, wherein the container metadata comprises an identifier, a storage location, runtime instances, dependencies, where output is emitted, and external services required, and wherein the data metadata comprises data set name, and data set location;

selecting a location from the request metadata when the request metadata includes the location or based on the evaluation of the second metadata and the request metadata;

placing the function at the location; and executing the function and returning a result of the function.

2. The method of claim 1, wherein the location comprises at least one of a node or a serverless platform, wherein the location is specified in the request metadata and the node and a container are selected from the evaluation of the second metadata, further comprising failing the request when the location in the request metadata is not available.

3. The method of claim 1, further comprising mapping the node metadata based on requirements of the container specified in the container metadata, wherein the container metadata includes services.

4. The method of claim 1, wherein selecting the location includes selecting a serverless platform from a set of available serverless platforms.

5. The method of claim 1, further comprising selecting the location based on a locality of data required by the function to a requestor.

6. The method of claim 1, further comprising selecting the node in a serverless platform based on requirements of the container and services of the node.

7. The method of claim 1, further comprising federating an edge serverless platform and a cloud serverless platform, wherein a first function is deployed to the edge serverless platform and a second function is deployed to the cloud serverless platform.

8. The method of claim 7, further comprising selecting the edge serverless platform when the first function is requested and selecting the cloud serverless platform when the second function is requested.

9. The method of claim 1, further comprising collecting, generating and/or inferring the request metadata and the second metadata.

10. A non-transitory storage medium having stored therein instructions that are executable by one or more hardware processors to perform operations comprising:

receiving a function request to execute a function in a computing environment, wherein the function request includes request metadata;

evaluating second metadata including container metadata, node metadata, and data metadata associated with the computing environment, wherein the node metadata comprises services metadata, memory metadata, and processor metadata, wherein the container metadata comprises an identifier, a storage location, runtime instances, dependencies, where output is emitted, and external services required, and wherein the data metadata comprises data set name, and data set location;

selecting a location from the request metadata when the request metadata includes the location or based on the evaluation of the second metadata and the request metadata;

placing the function at the location; and executing the function and returning a result of the function.

11. The non-transitory storage medium of claim 10, wherein the location comprises at least one of a node or a serverless platform, wherein the location is specified in the request metadata and the node and a container are selected from the evaluation of the second metadata, further comprising failing the request when the location in the request metadata is not available.

12. The non-transitory storage medium of claim 10, further comprising mapping the node metadata based on requirements of the container specified in the container metadata, wherein the container metadata includes services.

13. The non-transitory storage medium of claim 10, wherein selecting the location includes selecting a serverless platform from a set of available serverless platforms.

14. The non-transitory storage medium of claim 10, further comprising selecting the location based on a locality of data required by the function to a requestor.

15. The non-transitory storage medium of claim 10, further comprising selecting the node in a serverless platform based on requirements of the container and services of the node.

16. The non-transitory storage medium of claim 10, further comprising federating an edge serverless platform and a cloud serverless platform, wherein a first function is deployed to the edge serverless platform and a second function is deployed to the cloud serverless platform.

17. The non-transitory storage medium of claim 16, further comprising selecting the edge serverless platform when the first function is requested and selecting the cloud serverless platform when the second function is requested.

18. The non-transitory storage medium of claim 10, further comprising collecting, generating and/or inferring the request metadata and the second metadata.

* * * * *